United States Patent
Nave et al.

(10) Patent No.: US 7,911,731 B2
(45) Date of Patent: Mar. 22, 2011

(54) FIBER BRUSH FOR CABLE-LESS ACCESSORS IN A TAPE LIBRARY

(75) Inventors: Shawn M. Nave, Tucson, AZ (US); George G. Zamora, Vail, AZ (US); Lee C. Randall, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 949 days.

(21) Appl. No.: 11/697,039

(22) Filed: Apr. 5, 2007

(65) Prior Publication Data

US 2008/0247074 A1    Oct. 9, 2008

(51) Int. Cl.
*G11B 15/68* (2006.01)

(52) U.S. Cl. .................................. 360/92.1; 369/30.39

(58) Field of Classification Search ................. 360/92.1; 369/30.38–30.63
See application file for complete search history.

(56) References Cited

U.S. PATENT DOCUMENTS

| | | | |
|---|---|---|---|
| 3,699,266 A * | 10/1972 | Lemelson | ..................... 360/92.1 |
| 5,151,839 A | 9/1992 | Ota | |
| 6,222,699 B1 | 4/2001 | Luffel et al. | |
| 6,760,644 B2 | 7/2004 | Canaday et al. | |
| 6,798,612 B2 * | 9/2004 | Smith et al. | .................. 360/92.1 |
| 7,057,847 B2 * | 6/2006 | Reasoner et al. | ............ 360/92.1 |

FOREIGN PATENT DOCUMENTS

| | | |
|---|---|---|
| JP | 57-101880 | 6/1982 |
| JP | 03-137801 | 6/1991 |
| JP | 05-166249 | 7/1993 |
| JP | 05-190241 | 7/1993 |
| JP | 2001-023748 | 1/2001 |

* cited by examiner

*Primary Examiner* — A. J. Heinz (74) *Attorney, Agent, or Firm* — Rabindranath Dutta; Konrad Raynes & Victor LLP (57) ABSTRACT

A tape library system includes a plurality of conductive track assemblies including at least one linear conductive strip, and at least one guide track. The system further includes a first fiber brush assembly and a second fiber brush assembly separated from each other by a predetermined separation distance, each of the first and second fiber brush assemblies comprising a spring biasing a track wheel, and a fiber brush attached to the fiber brush assembly and in electrical contact with the conductive strip. The fiber brush assembly linearly translates along the conductive track assembly on an axis parallel to the conductive strip.

20 Claims, 10 Drawing Sheets

FIBER BRUSH FOR CABLE-LESS ACCESSORS IN A TAPE LIBRARY

FIELD OF INVENTION

The present invention generally relates to accessors in a tape library, and more specifically to cable-less accessors.

BACKGROUND OF THE INVENTION

In today's tape libraries, a robotic accessor is used to move tape cartridges from storage bins within the library to tape drives where the cartridge can be read or written. These robotic accessors require power to provide the motion and logic onboard the accessor and also require communication with the rest of the library system in order to perform their most basic tasks. Typically, the power and communication are provided to the accessor through a dynamic cable that is tethered between the accessor and some static portion of the library chassis or frame. Today, many libraries are scalable so that expansion frames or other units can be added to the base frame or unit. During expansion the dynamic cable that is attached to the accessor must be replaced so that it can adapt to this new length of accessor travel. This dynamic cable replacement is a costly service replacement and an unwanted customer outage where the robotic accessor becomes unavailable while the dynamic cable is being changed. Also, by having cables of different lengths to accommodate the different modular frame sizes, a costly inventory of different cable lengths is required in manufacturing sites and service replacement part centers. Additionally, some customers would like more robotic performance in their large library systems and multiple robotic accessors could provide this performance.

If each accessor is tethered with a cable, the cables between multiple (more than two) accessors could quickly become tangled and cause the system to fail. It is also desirable to configure large libraries with a nonlinear accessor path. While cables can be easily designed to roll and unroll reliably in a linear fashion, for an accessor to turn a corner or move in a different nonlinear direction, it becomes very difficult to have the cable follow the accessor in its nonlinear path. Due to these difficulties, a robotic accessor without the cable is desirable.

One method of designing cable-less accessors is to replace the cable with a sliding electrical brush contact that delivers power and communication to the cable-less accessor. Brush contacts have been previously utilized with electric trains and trolleys as well as elevators. These types of brush designs use self-lubricating composite brushes. The electrical brush contact works by having the composite brush slide on a linear track that is typically made of a copper material, either a raw copper track or exposed copper within a printed circuit board. The electrical connection is made by the brush always staying in contact with the copper track by sliding along its surface. In order to prevent the brush from quickly wearing away during this sliding motion embedded solid lubricants are added to the brush. The nature of this lubrication mechanism requires that the brush must experience some wear to transfer lubricant from the brush to the copper track. This wear creates electrically conductive debris that can build up over the long life experienced by an accessor in a tape library. Additionally, for modularly expandable libraries, gaps or joints between adjacent sections of copper track must be carefully constructed to minimize wear on the brushes. This careful alignment of tracks adds significant cost to the design of the library. Although modular libraries are highly desirable, the presence of a gap between adjoining components leads to undesirable wear on the brushes.

A further issue that arises when composite brushes are used is contamination of the copper track by the lubricant in the brush. The main form of contamination that is seen is a silver sulfide, which appears as tarnish on the copper track surface. The silver sulfide film on the surface of the copper track creates an unacceptably high contact resistance on low current circuits. Although the low current communication signals to the robotic accessor can be modulated on top of the higher current power signals to the accessor, this adds additional cost and design complexity by requiring circuitry to modulate and demodulate these low current signals.

Figure 1:
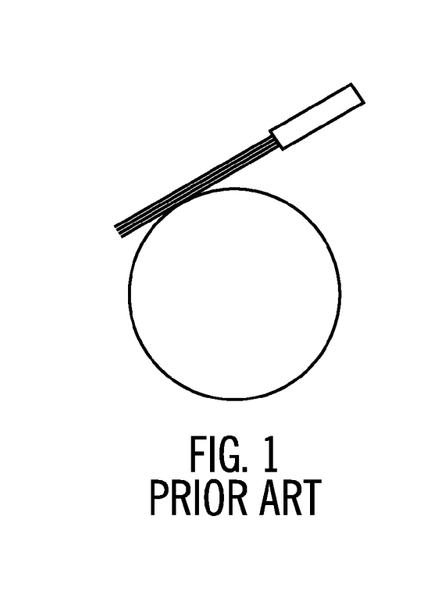
FIG. 1 illustrates a prior art fiber brush.

A different type of brush than composite brush is a fiber brush for electrical contacts for slip rings, as shown in prior art FIG. 1. Fiber brushes have advantages of multiple points of contact per brush bundle, no surface lubrication required, long life, low contact force per fiber, low wear rates, low contact resistance, very little debris generation, and a wide range of operating speeds. However, FIG. 1 shows that the fibers of the brush are always touching the round slip ring surface and are tangent to this surface such that the rotating ring can rotate in either direction, clockwise or counter-clockwise. Such a configuration mandates undesirable design characteristics for a tape library application.

What is needed is a low wear, high reliability, and low cost method of transferring electrical power and communication to the robotic accessor. It is therefore a challenge to overcome these, and other, disadvantages.

SUMMARY OF THE INVENTION

A tape library system includes a plurality of conductive track assemblies including at least one linear conductive strip, and at least one guide track. The system further includes a first fiber brush assembly and a second fiber brush assembly separated from each other by a predetermined separation distance, each of the first and second fiber brush assemblies comprising a spring biasing a track wheel, and a fiber brush attached to the fiber brush assembly and in electrical contact with the conductive strip. The fiber brush assembly linearly translates along the conductive track assembly on an axis parallel to the conductive strip.

Another aspect of the invention provides an accessor for a tape library including a frame and at least a first fiber brush assembly and a second fiber brush assembly separated from each other, each of the first and second fiber brush assemblies comprising a spring biasing a track wheel, and at least one fiber brush attached to the fiber brush assembly, wherein the displacement of the at least one fiber brush with respect to the frame is responsive to bias of the track wheel.

Yet another aspect of the invention provides a method for translating a tape accessor. The method includes positioning at least a first conductive track assembly and a second conductive track assembly in series, positioning the tape accessor on the first conductive track assembly and positioning first and second fiber brush assemblies and their fiber brushes in electrical contact with another conductive track positioned with respect to the first conductive track assembly. In addition, the method includes electrically contacting the track assembly at two fiber brushes, translating the tape accessor along an arcuate path while simultaneously separating one of the two fiber brush assemblies from electrical contact with the track, the translation responsive to the electrical contact, and restoring the electrical contact.

The foregoing embodiments and other embodiments, objects, and aspects as well as features and advantages of the present invention will become further apparent from the following detailed description of various embodiments of the present invention. The detailed description and drawings are merely illustrative of the present invention, rather than limiting the scope of the present invention being defined by the appended claims and equivalents thereof.

DETAILED DESCRIPTION OF THE PRESENT INVENTION

Figure 2:
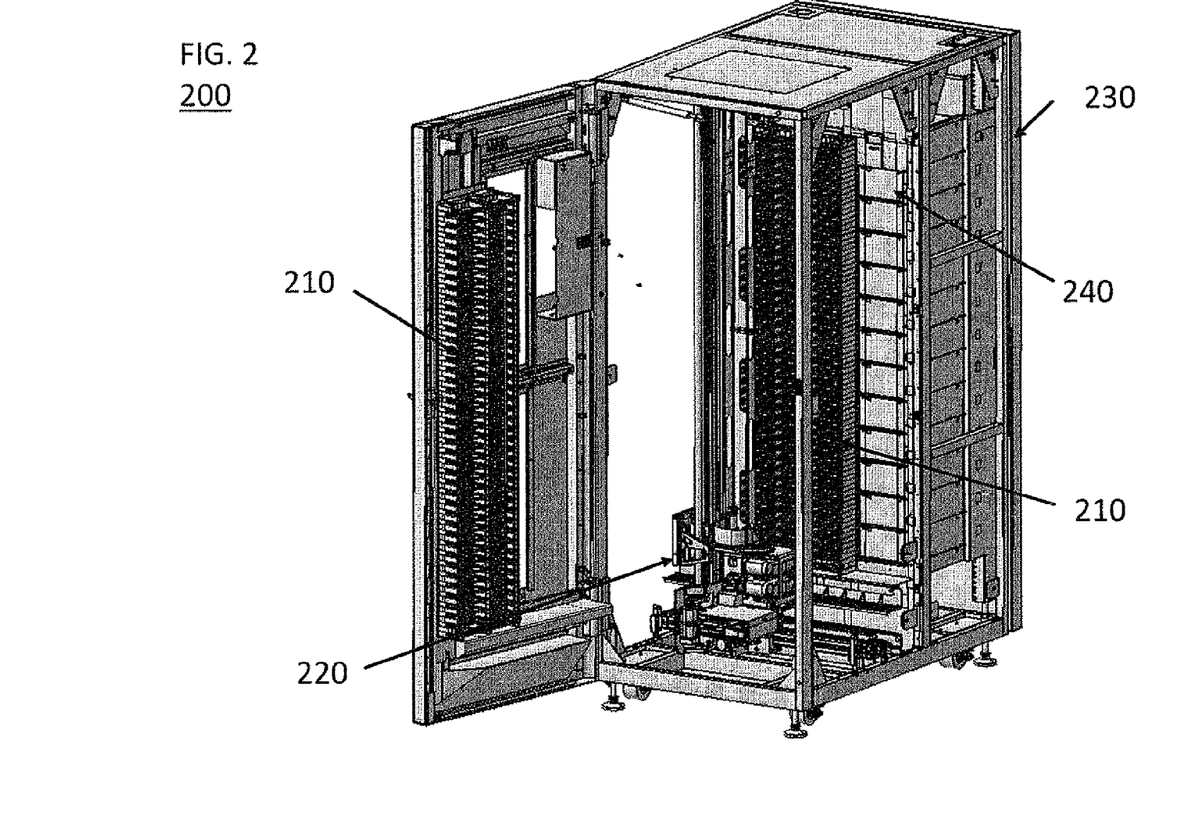
FIG. 2 illustrates one embodiment of a tape library in accordance with one aspect of the invention.

FIG. 2 illustrates an exemplary linear tape library 200 in accordance with one aspect of the invention. Library 200 includes a tape library frame 230 supporting a plurality of tape cartridge storage bins 210 and tape drive bays 240. A cable-free robotic accessor 220 translates along at least one linear rail to move tape cartridges between the tape cartridge storage bins 210 and tape drive bays 240. In one embodiment, the linear tape library is implemented as an IBM 3584 tape library, available from IBM® Corporation, Armonk, N.Y. The tape library frame can be manufactured from any appropriate relatively rigid material, such as a metal or polymer. In one embodiment, as shown in FIG. 2, at least one tape cartridge storage bin 210 is mounted on a hinged door.

In one embodiment, each of the plurality of tape cartridge storage bins is configured to store at least one tape cartridge. In one embodiment each tape drive bay is configured to receive a tape cartridge and read/write information to/from the tape cartridge. The tape accessor device 220 is configured to retrieve a predetermined tape from tape cartridge storage bins 210, translate the tape along the conductive track assemblies, and deliver the retrieved tape to a predetermined tape drive bay 240. In one embodiment, the library 200 further includes at least one power source configured to supply a voltage differential to the conductive track and at least one controller configured to supply a control signal to the conductive track, such that the control signal controls translation of the first fiber brush assembly and second fiber brush assembly.

Figure 3A:
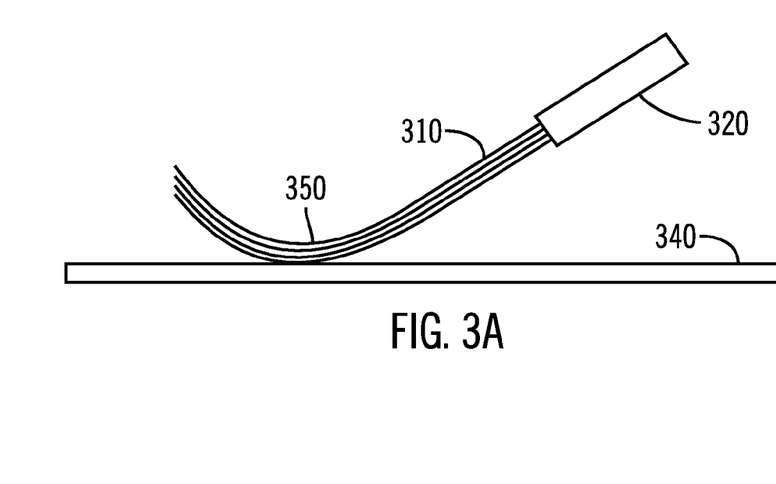
FIGS. 3A and 3B illustrate an embodiment of a fiber brush, in accordance with one aspect of the invention.
Figure 3B:
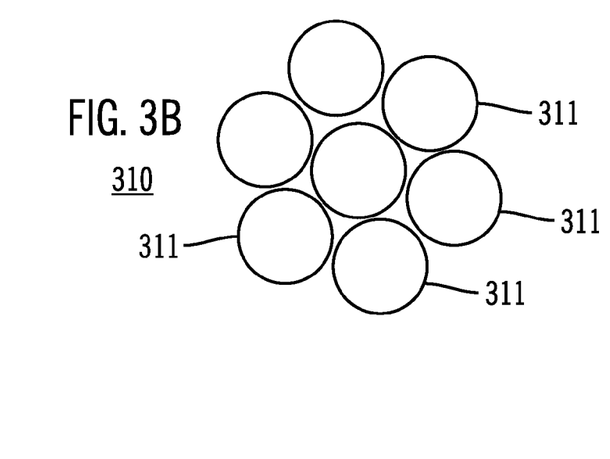

FIG. 3A illustrates a close up side view of a fiber brush 310 on a linear track in accordance with one aspect of the invention. Fiber brush 310 includes an arcuate portion 350 attached to a base 320. The arcuate portion 350 defines a radius configured to translate along a linear track 340 in either direction along an axis defined by the linear track 340. In one embodiment, the fiber brush 310 includes a plurality of individual fibers (311 in FIG. 3B). Each of the fibers is configured to provide good electrical conductivity with the linear track. In one embodiment, the fibers each comprise approximately 75 percent silver and approximately 25 percent copper. In another embodiment, the fibers each comprise approximately 60 percent silver and approximately 40 percent copper. In other embodiments, the fibers comprise an alloy of appropriate conductive materials, such as a tin alloy, a gold alloy, a platinum alloy, or the like. In one embodiment, the linear track 340 includes a nickel covering separating a copper material and a gold coating. In one embodiment, each of the fiber brushes 310 includes approximately 12 fibers 311. The arcuate portion of each fiber 311 allows for motion against the linear conductive strips in linear track 340 in both forward and reverse directions. As the fiber brush bundle 310 is put in contact with the conductive track 340, the fiber brush bundle 310 naturally fans open such that each fiber 311 in the bundle is in contact with the conductive strip 340. Since each fiber 311 is independently flexed during contact with the linear track 340, the individual contact pressure is low, resulting in reduced wear and debris generation. Each fiber bundle 310 is connected with an insulated wire (not shown) to the appropriate electronic systems on the moving accessor, such as a controller configured to affect the translation of the accessor along the conductive strips. FIG. 3B illustrates a cross section of the fiber brush 310, illustrating 7 individual fibers 311, although any number of individual fibers can be used.

Figure 4:
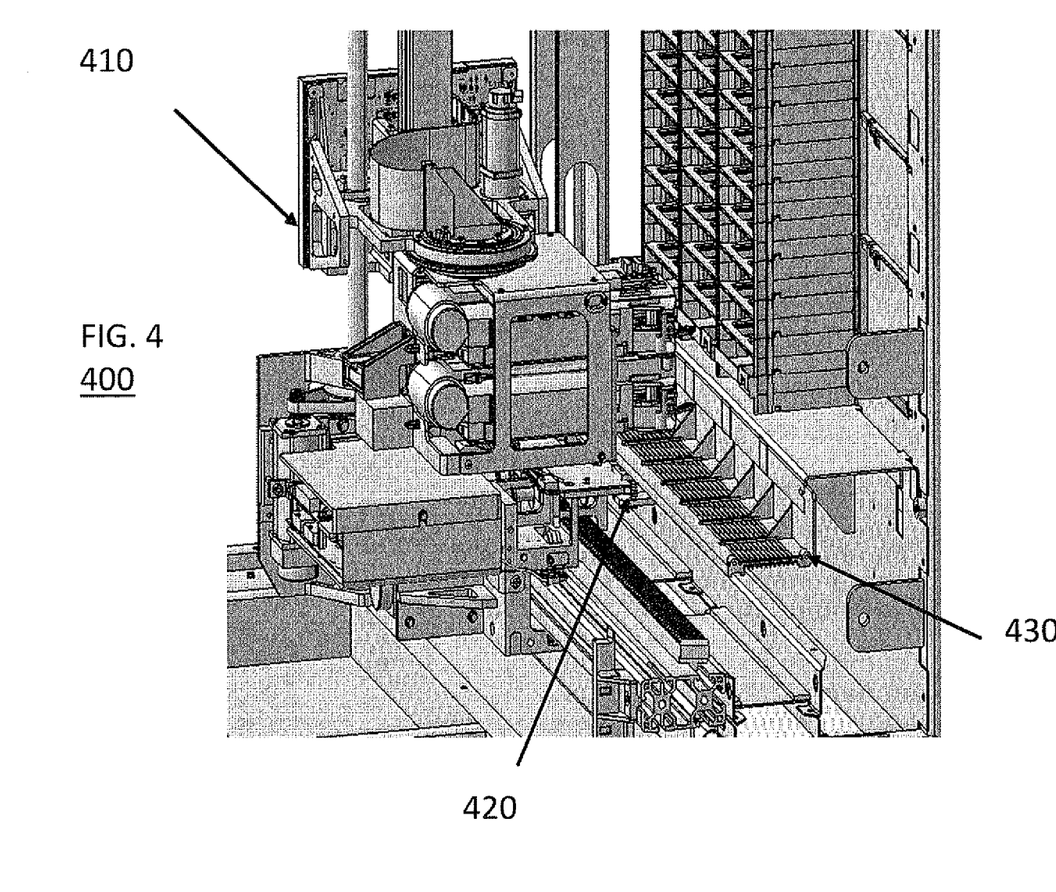
FIG. 4 illustrates a close up perspective view of the tape library of FIG. 2, in accordance with one aspect of the invention.

FIG. 4 illustrates a close up view of a portion 400 of the tape library 200 illustrated in FIG. 2. Specifically, FIG. 4 illustrates robotic accessor 410 including a fiber brush assembly 420 (as in fiber brush 310 in FIG. 3) along a conductive track assembly 430.

Figure 5:
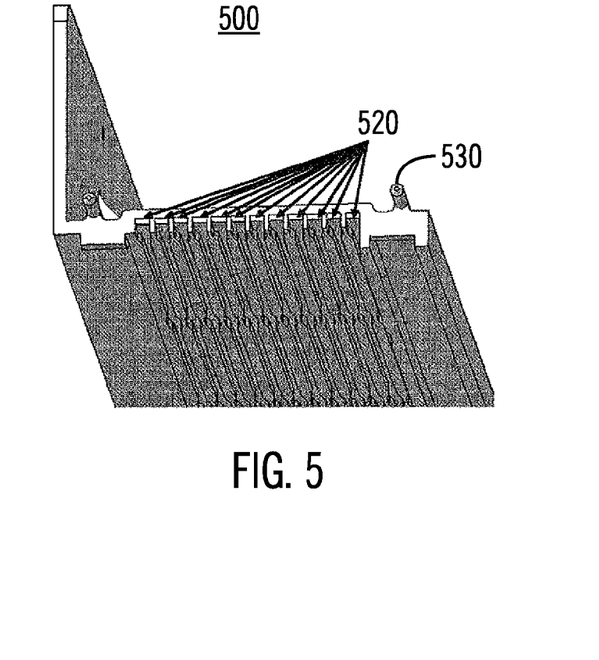
FIG. 5 illustrates an embodiment of a conductive track assembly, in accordance with one aspect of the invention.

FIG. 5 illustrates a perspective view of a conductive track assembly 500 in accordance with one aspect of the invention. Conductive track assembly includes a plurality of linear conductive strips 520 (such as 340 as described in FIG. 3A) disposed in a substantially parallel array. In one embodiment, the conductive track assembly 500 includes at least one modular pin 530 configured to mate with a modular pin receptacle (840 in FIG. 8). In one embodiment, the modular pin 530 and modular pin receptacle snap fit together. In other embodiments, the modular pin 530 and modular pin receptacle attach with a latch mechanism. In yet other embodiments, the modular pin 530 and modular pin receptacle attach with a fastening device, such as a screw. In one embodiment, each linear conductive strip 520 is electrically insulated from adjoining linear conductive strips such as with a section of guide track. In one embodiment, the guide track prevents a fiber brush (such as fiber brush 310) configured to interface with a first linear conductive strip 520 from electrically contacting with an adjacent second linear conductive strip 520. In one embodiment, the guide track comprises a first wall and a second wall separated by the linear conductive strip 520. In one embodiment, the first wall and second wall restrict lateral movement of a fiber brush 310. In one embodiment, the first wall and second wall are each 2 millimeters high. In another embodiment, the height of the first wall and second wall are proportional to the thickness of the fiber brush 310. For example, the first wall and second wall are twice as high as the thickness of the fiber brush 310, in one embodiment.

Figure 6:
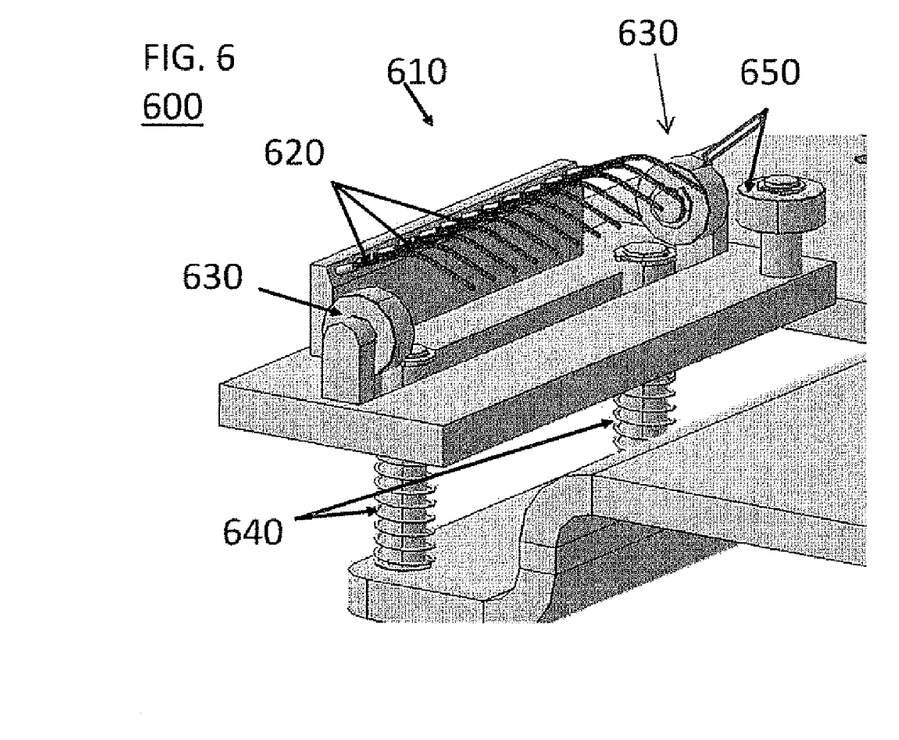
FIG. 6 illustrates an embodiment of a fiber brush assembly, in accordance with one aspect of the invention.

FIG. 6 illustrates a perspective view of one embodiment of a fiber brush assembly 600 in accordance with one aspect of the invention. The fiber brush assembly 600 is a portion of the accessor and receives electrical power as well as control signals transmitted to the accessor. Fiber brush assembly 600 includes a fiber brush assembly 610 including a plurality of fiber brushes 620 (such as fiber brushes 310) guided along a linear path by guide wheels 630 and 650. In addition, the fiber brush assembly includes a ledge biased by biasing members 640. In one embodiment, biasing members 640 are springs. In one embodiment, a first guide wheel 630 rotates about a first axis, while a second guide wheel 650 rotates about a second axis that is substantially perpendicular to the first axis.

Figure 7:
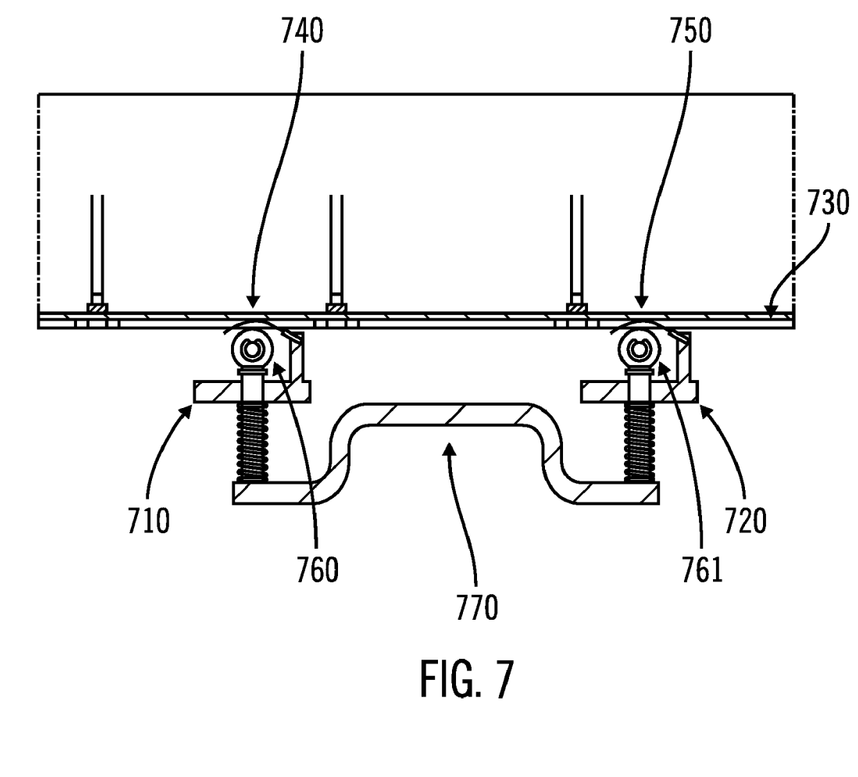
FIG. 7 illustrates an embodiment of a fiber brush assembly and a conductive track assembly, in accordance with one aspect of the invention.

FIG. 7 illustrates a side view of one embodiment of a fiber brush assembly riding on a conductive track assembly in accordance with one aspect of the invention. As seen in FIG. 7, ledge 710 is biased in the direction of the conductive track assembly 730, causing a first fiber brush assembly 740 and second fiber brush assembly 750 to exert a force against the conductive track assembly 730 (and in particular, a conductive track positioned on the conductive track assembly) while guide wheel 760 and 761 rides along conductive track assembly 730. In addition, frame 770 maintains the two fiber brushes 740 and 750 a predetermined distance apart. In one embodiment, frame 770 is rigidly attached to robotic accessor 220 (FIG. 2).

Figure 8:
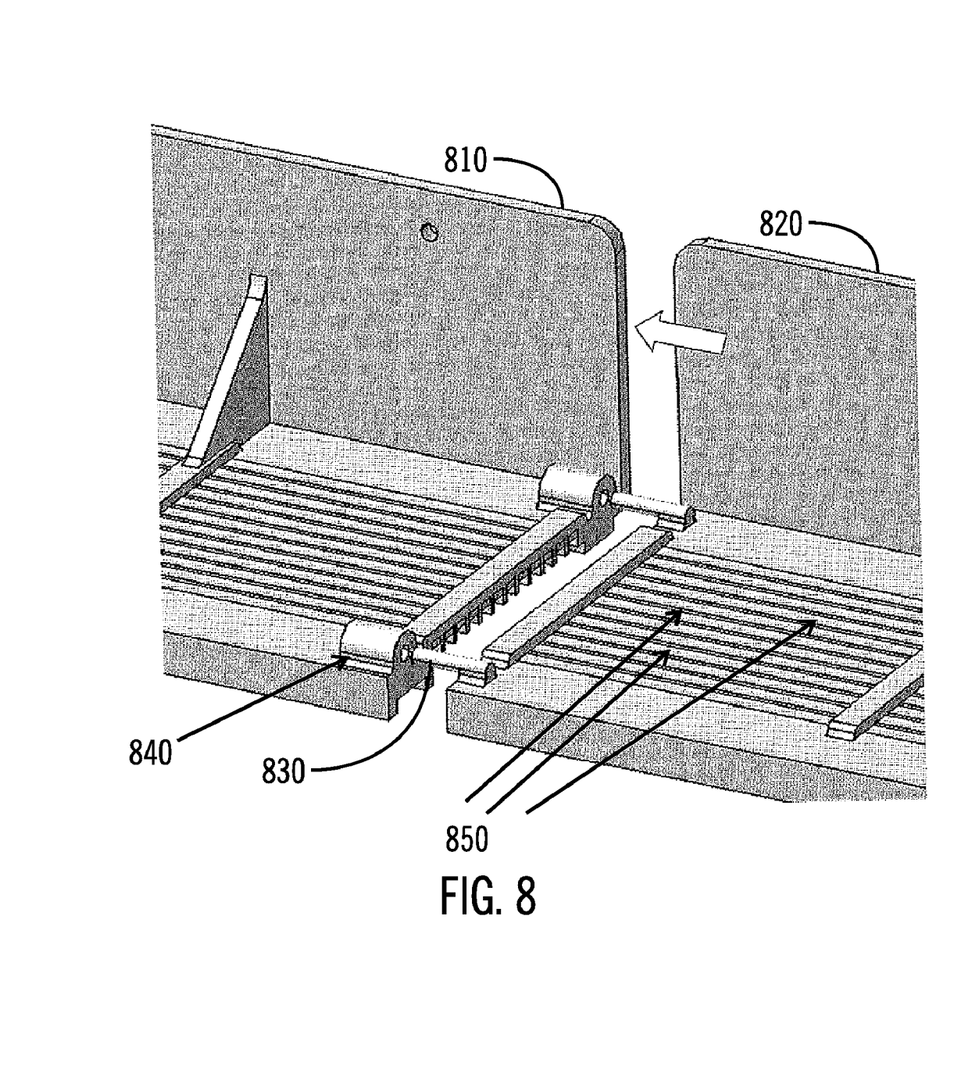
FIG. 8 illustrates an embodiment of two conductive track assemblies in accordance with another aspect of the invention.

FIG. 8 illustrates one embodiment of a first conductive track assembly 810 and a second conductive track assembly 820 attaching at a modular pin 830 and modular pin receptacle 840. While the modular pin 830 is illustrated as a portion of the second conductive track assembly, the configuration of the modular pin 830 and modular pin receptacle 840 could be reversed. In one embodiment, each of the first conductive track assembly and second conductive track assembly include both male modular pins 830 and modular pin receptacles adjacent each other. FIG. 8 further illustrates a plurality of linear conductive strips 850 disposed in a substantially parallel configuration along the length of each of the first conductive track assembly 810 and second conductive track assembly 820. In one embodiment, each of the first conductive track assembly 810 and second conductive track assembly 820 include a quantity of pins and sockets based on the quantity of conductive tracks. In one embodiment, each of the first conductive track assembly 810 and second conductive track assembly 820 include one pin and one socket for each conductive track carried on the first conductive track assembly 810 and second conductive track assembly 820. In one embodiment, each pins and sockets is crimped to insulated wire that is soldered to the back side at both ends of each strip of conductive track. As the first conductive track assembly 810 and second conductive track assembly 820 are assembled, the mechanical track assembly is electrically connected via the plug and receptacle. A good mechanical connection is maintained by having mating pins and holes that allow the conductive track assemblies to be mounted end to end with accurate alignment.

Figure 9:
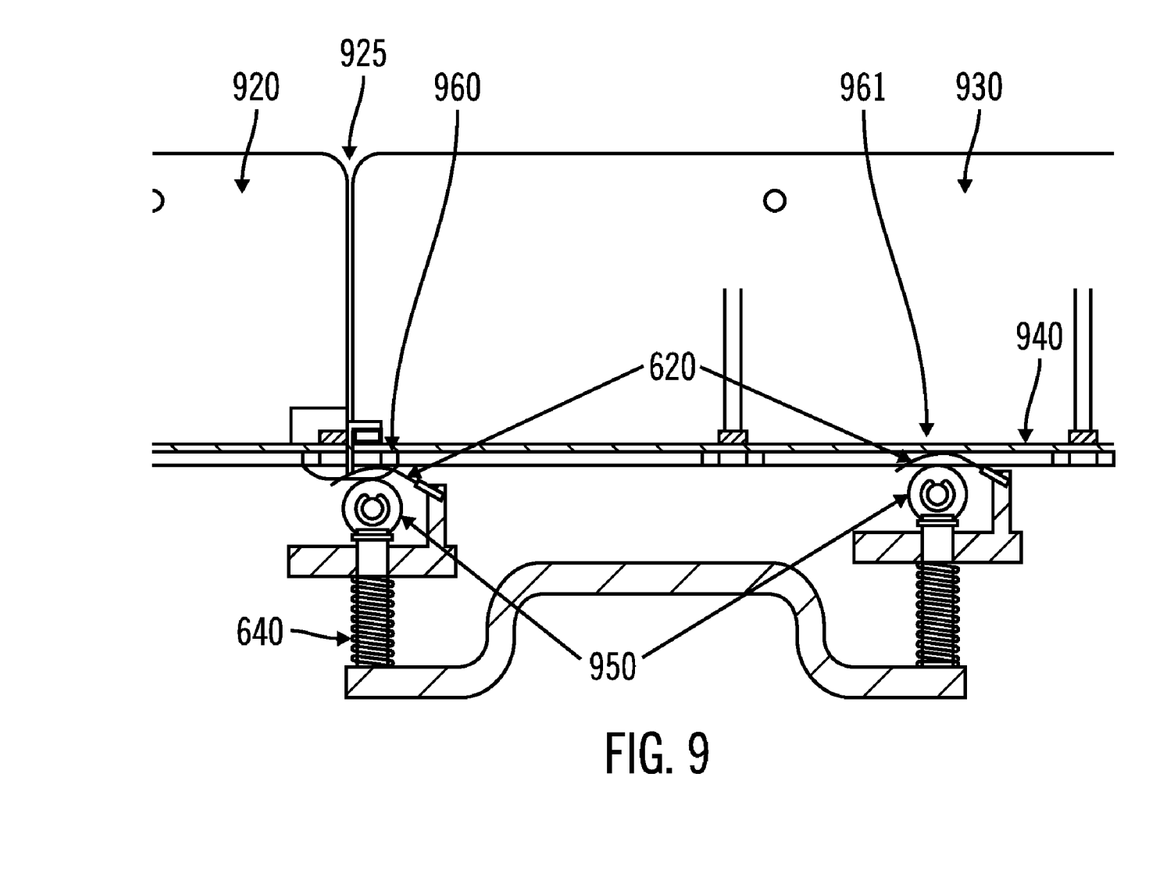
FIG. 9 illustrates another embodiment of a fiber brush assembly and a conductive track assembly, in accordance with one aspect of the invention.
Figure 10:
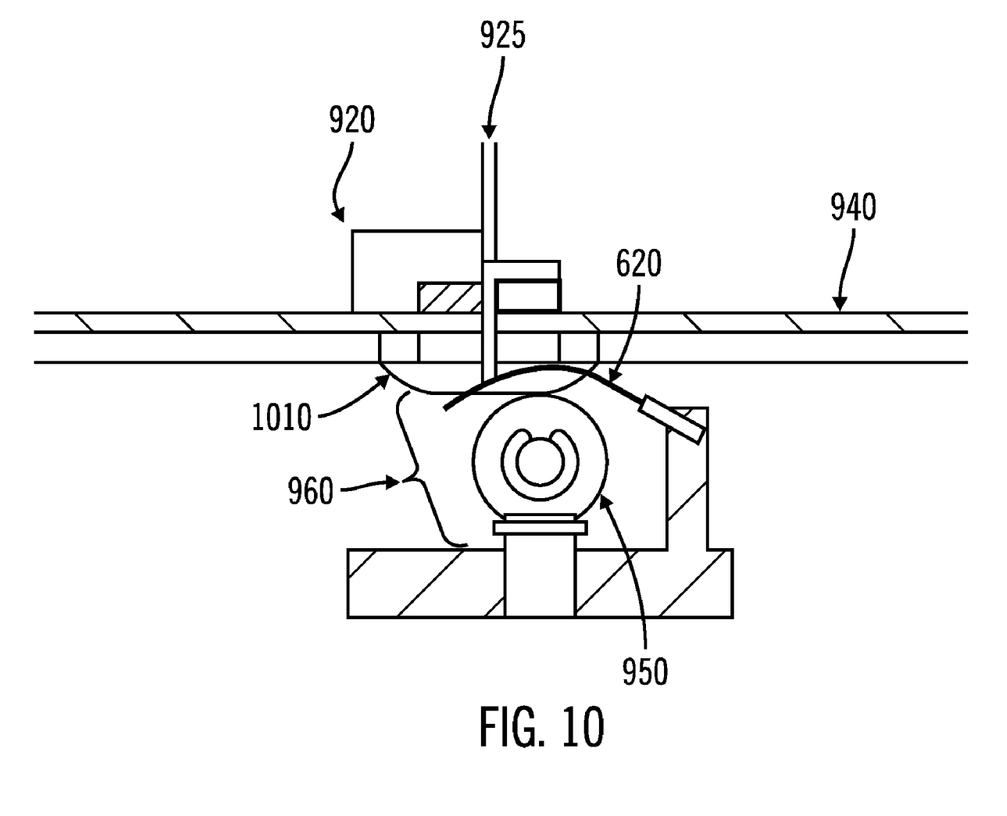
FIG. 10 illustrates another embodiment of a fiber brush assembly and a conductive track assembly, in accordance with one aspect of the invention.

FIG. 9 illustrates a side view of one embodiment of a fiber brush assembly riding on a first conductive track assembly 920 and a second conductive track assembly 930 in accordance with one aspect of the invention. As seen in FIG. 9, the ledge is biased in the direction of the conductive track assembly 940, causing a first fiber brush 960 and second fiber brush 961 to exert a force against the conductive track assembly 940 (and in particular, a conductive track positioned on the conductive track assembly) while guide wheels 950 ride along the conductive track assembly 940 in a guide track. In addition, a frame maintains the first fiber brush 960 and second fiber brush 961 a predetermined distance apart. The first conductive track assembly 920 and second conductive track assembly 930 include an arcuate portion positioned near the intersection of the first conductive track assembly 920 and second conductive track assembly 930. The arcuate portion biases the guide wheels 950 away from the first conductive track assembly 920 and second conductive track assembly 930 as the guide wheel 950 traverses the arcuate portion. This biasing removes the fiber brush 960 positioned adjacent the guide wheel 950 away from the conductive track, resulting in a loss of electrical contact between the conductive track and the first fiber brush 960, while maintaining the electrical contact between the conductive track and the second fiber brush 961. As the guide wheel 950 leaves the arcuate portion, the guide wheel 950 returns to level, and the first fiber brush 960 regains electrical contact with the conductive track 940. In one embodiment, the arcuate portion comprises mating a partial arcuate portion of the first conductive track assembly 920 with a matched partial arcuate portion of the second conductive track assembly 930. FIG. 10 illustrates the arcuate portion in a close up view, illustrating guide wheel 950 traversing arcuate portion 1010.

To avoid the fiber brushes from experiencing undue wear from crossing the gap between the first conductive track assembly 920 and second conductive track assembly 930, the guide wheels 950 and guide tracks are used to lift the fiber brushes 960 and 961 away from the conductive strips 940 at the gap 925. The guide tracks act as a cam surface in which the guide wheels 950 are kept in contact with by the biasing springs 640. At the end of each conductive track assembly 920, 930 the guide tracks have a small ramp 1010, or arcuate portion, that lifts the brush assembly 960, 961 away from the conductive strip surface 940. When the fiber brush assembly 960 is lifted away, electrical contact is temporarily lost between this fiber brush assembly 960 and the conductive track 940. However, the second fiber brush assembly 961 remains in contact with the conductive track 940 at least until the first fiber brush assembly 960 regains contact with the conductive track 940 after crossing the gap 925. For the accessor 220 to completely cross the track gap 925, the second fiber brush assembly 961 is lifted off the conductive track 940 in similar fashion while the first fiber brush assembly 960 remains in constant contact.

In one embodiment, a tape library system includes a plurality of conductive track assemblies such as first conductive track assembly 920 and second conductive track assembly 930. Each of the first conductive track assembly 920 and second conductive track assembly 930 includes at least one linear conductive strip 940, and at least one guide track associated with each linear conductive strip 940. Each guide track includes at least one arcuate portion 1010 positioned adjacent an edge of the conductive track assembly 920, 930. Furthermore, the tape library includes at least a first fiber brush assembly 960 and a second fiber brush assembly 961 separated from each other by a predetermined separation distance based on a space based on the gap 925 between adjacent conductive assemblies. Each of the first and second fiber brush assemblies 960, 961 includes a spring 640 biasing a track wheel 950, and a fiber brush 620 attached to the fiber brush assembly 960, 961, the fiber brush 620 in electrical contact with the conductive strip 940 wherein the fiber brush assembly 960, 961 linearly translates along the conductive track assembly 920, 930 on an axis parallel to the conductive strip 940, and wherein the fiber brush assembly 960, 961 translates along an arcuate path relative to the axis when the guide wheels 950 contacts the arcuate portion 1010 of the guide track 920, 930 and separates the fiber brush 960, 961 from the conductive strip 940, and wherein the arcuate path is responsive to the arcuate portion 1010.

In one embodiment, the conductive strips 940 are positioned above the fiber brushes 620 relative to the force of gravity so that any material that rubs off of the fiber brush 620 will tend to fall away from the conductive strips 940.

Figure 11:
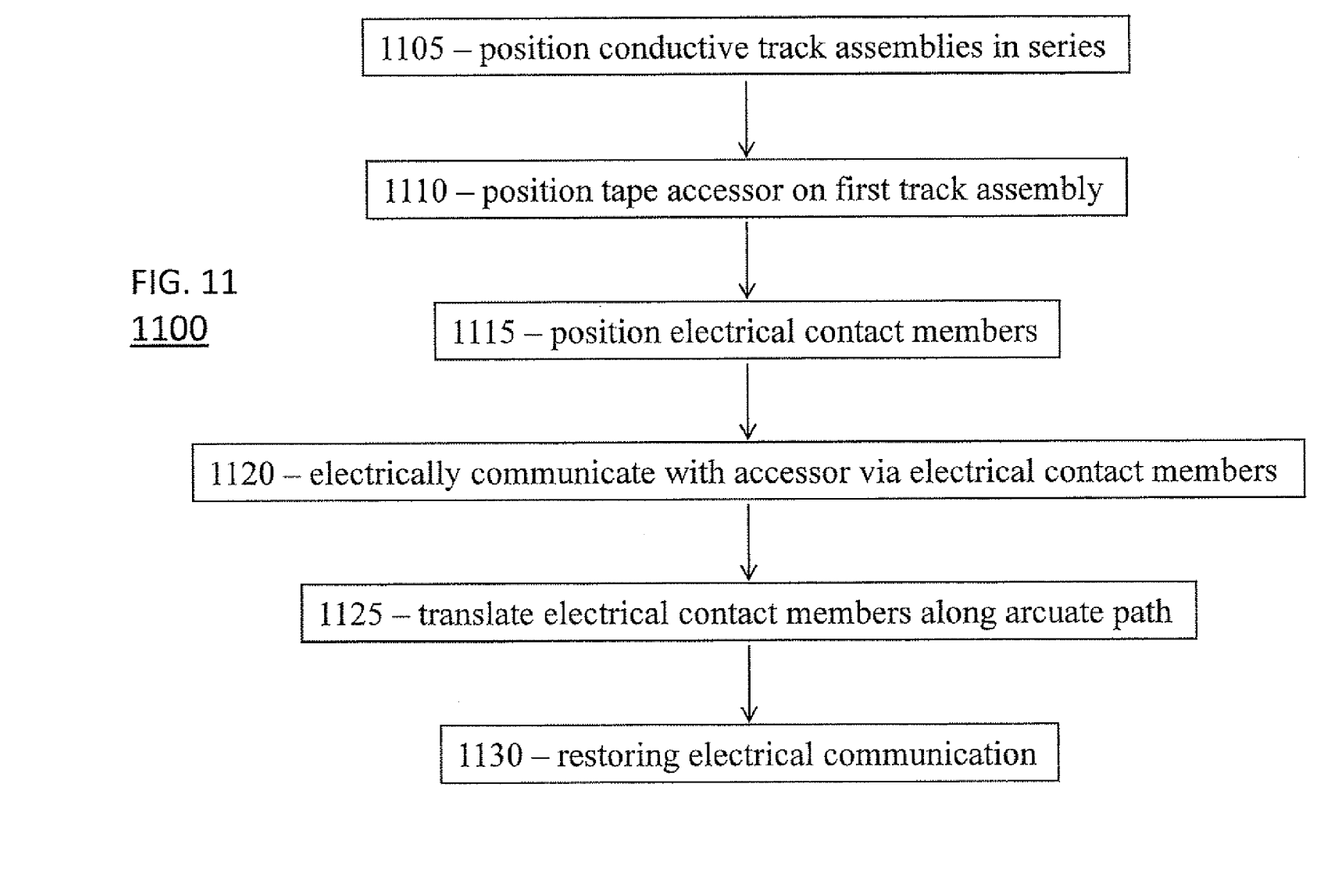
FIG. 11 illustrates an embodiment of a method for translating a tape accessor, in accordance with one aspect of the invention.

FIG. 11 illustrates one embodiment of a method 1100 for translating a tape accessor in accordance with one aspect of the invention. Method 1100 begins at 1105 by positioning at least a first conductive track assembly and a second conductive track assembly in series. Method 1100 then positions the tape accessor on the first conductive track assembly at step 1110 prior to positioning first and second fiber brushes in electrical contact with a conductive track positioned with respect to the first conductive track assembly at step 1115. Having positioned the accessor, the method continues by electrically contacting, step 1120, with the accessor via the track assembly at two fiber brushes. One of the first fiber brush and second fiber brush is translated along an arcuate path while simultaneously separating only one of the first fiber brush and second fiber brush from electrical contact with the conductive track responsive to the electrical contact. In one embodiment, the arcuate path is defined by at least one arcuate portion adjacent an intersection between the first conductive track assembly and second conductive track assembly at step 1125. After the fiber brush traverses the arcuate portion, electrical contact between the conductive track assembly and fiber brush is restored at step 1130.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

We claim:

1. A tape library system comprising:
   a plurality of conductive track assemblies, the each conductive track assembly including at least one linear conductive strip, and at least one guide track associated with each linear conductive strip; and
   at least a first fiber brush assembly and a second fiber brush assembly separated from each other, the first fiber brush assembly including a first spring biasing a first guide wheel and a first fiber brush attached to the first fiber brush assembly and the second fiber brush assembly including a second spring biasing a second guide wheel, and a second fiber brush attached to the second fiber brush assembly, at least one of the first fiber brush and second fiber brush in electrical contact with the conductive strip wherein each of the first and the second fiber brush assembly linearly translates along the conductive track assembly on an axis parallel to the conductive strip.

2. The system of claim 1 wherein each guide track includes at least one arcuate portion positioned adjacent an edge of the conductive track assembly and wherein at least a portion of one of the first fiber brush assembly and second fiber brush assembly translates along an arcuate path relative to the axis when one guide wheel contacts the arcuate portion of the guide track and separates one of the first fiber brush and second fiber brush from the conductive strip, and wherein the arcuate path is responsive to the arcuate portion.

3. The system of claim 1 wherein the first fiber brush assembly and second fiber brush assembly are separated by a predetermined distance to maintain at least one of the first fiber brush and second fiber brush in continuous contact with the conductive strip.

4. The system of claim 1 wherein at least one of the first fiber brush and second fiber brush is an electrical contact member.

5. The system of claim 4 wherein each fiber within each of the first and the second fiber brush comprises an alloy of silver and copper.

6. The system of claim 1 wherein at least one of the first fiber brush and second fiber brush comprises a plurality of fibers.

7. The system of claim 1 wherein the conductive track comprises at least one of the group consisting of a nickel coating separating a base copper material and a gold coating, a nickel coating separating a base copper alloy material and gold alloy coating, a nickel alloy coating separating a base copper material and a gold coating, a nickel alloy coating separating base copper alloy material and gold alloy coating, and a conductive alloy.

8. The system of claim 1 wherein each conductive track assembly comprises a plurality of conductive strips arrayed substantially parallel to each other and wherein the first fiber brush assembly and second fiber brush assembly comprise a plurality of fiber brushes arrayed in substantial parallel with each other.

9. The system of claim 1 wherein each conductive track assembly includes a first end and a second end, and wherein the first end of a first conductive track assembly is configured to mate with the second end of a second conductive track assembly.

10. The system of claim 1 wherein each conductive track assembly includes at least a first wall and a second wall, the first wall and second wall separated by at least one conductive strip, and wherein the first wall and second wall restrict lateral movement of at least one of the first fiber brush and second fiber brush.

11. The system of claim 10 wherein the first wall and second wall reduce contact between at least one of the first fiber brush and second fiber brush and a conductive strip adjacent to the conductive strip in contact with the at least one of the first fiber brush and second fiber brush.

12. The system of claim 1 further comprising a tape accessor device attached to a frame, such that the tape accessor device translates laterally responsive to the movement of the fiber brush assembly along the conductive strip.

13. The system of claim 12 further comprising:
   a tape library frame supporting the plurality of conductive track assemblies;
   a plurality of tape cartridge storage bins configured to store at least one tape cartridge; and
   at least one tape drive bay, wherein the tape accessor device is configured to retrieve a predetermined tape cartridge from a tape cartridge storage bins, translate the tape cartridge along the conductive track assemblies, and deliver the retrieved tape cartridge to a predetermined tape drive bay.

14. The system of claim 13 further comprising at least one power source configured to supply a voltage differential to the conductive track and at least one controller configured to supply a control signal to the conductive track, wherein the control signal controls translation of the first fiber brush assembly and second fiber brush assembly.

15. A method for translating a tape accessor comprising:
   positioning at least a first conductive track assembly and a second conductive track assembly, wherein each of the first and the second conductive track assembly includes a first end and a second end, and wherein the first end of the first conductive track assembly is configured to mate with the second end of the second conductive track assembly;

positioning the tape accessor on the first conductive track assembly;

positioning a first fiber brush assembly and a second fiber brush assembly in electrical contact with a conductive track positioned with respect to the first conductive track assembly;

electrically contacting with the tape accessor via the first conductive track assembly;

in response to electrically contacting with the tape accessor via the first conductive track assembly, translating one of the first fiber brush and second fiber brush along an arcuate path while simultaneously separating only one of the first fiber brush and second fiber brush from electrical contact with the conductive track; and restoring the electrical contact.

16. The method of claim 15 wherein each of the first and the second fiber brush is an electrical contact member.

17. The method of claim 15 wherein the fiber brush comprises a plurality of fibers.

18. The method of claim 15 wherein each fiber within the first and the second fiber brush comprises an alloy of silver and copper.

19. The method of claim 15, wherein the first fiber brush assembly and second fiber brush assembly are separated by a predetermined distance to maintain at least one of the first fiber brush and second fiber brush in continuous contact with a conductive strip.

20. The method of claim 15, wherein each of the first and the second conductive track assembly includes at least a first wall and a second wall, the first wall and second wall separated by at least one conductive strip, and wherein the first wall and second wall restrict lateral movement of at least one of the first fiber brush and second fiber brush.

* * * * *